United States Patent [19] [11] 4,119,359
Schultz [45] Oct. 10, 1978

[54] PHONO-SOCKET ASSEMBLY AND METHOD

[75] Inventor: Ronald L. Schultz, Northfield, Ill.

[73] Assignee: Stanford Applied Engineering, Inc., Santa Clara, Calif.

[21] Appl. No.: 827,447

[22] Filed: Aug. 25, 1977

[51] Int. Cl.[2] .......................... H01R 17/06; H02B 1/02
[52] U.S. Cl. .......................................... 339/128; 29/629; 339/142; 339/177 R; 339/217 J
[58] Field of Search .................. 339/17 C, 125 R, 128, 339/131, 136 R, 136 C, 136 S, 138, 139 R, 139 C, 140 R, 140 C, 142, 177 R, 177 E, 182 R, 182 L, 182 T, 183, 217 J, 220 R, 220 C, 220 L, 220 T; 29/629

[56] References Cited

U.S. PATENT DOCUMENTS

| | | | |
|---|---|---|---|
| 1,140,498 | 5/1915 | Cassidy | 339/136 S |
| 2,590,001 | 3/1952 | Fox | 339/131 |
| 2,717,367 | 9/1955 | Puerner | 339/217 J |
| 2,869,090 | 1/1959 | Johanson | 339/177 E |

*Primary Examiner*—Neil Abrams
*Attorney, Agent, or Firm*—Hill, Gross, Simpson, Van Santen, Steadman, Chiara & Simpson

[57] ABSTRACT

A phono-socket assembly has a stamped and drawn thin sheet metal grounding shell provided with retainer means at one end of the shell and supporting attachment bracket means on the opposite end of the shell for mounting of the assembly on a panel, and an elongate tubular contact has a phono-plug pin receiving head end portion mounted within the shell on annular insulating means with a terminal portion extending from said opposite end of the shell, retaining fingers extending from said opposite end of the shell and having retaining tips turned toward and into retaining engagement with the insulating means to retain the insulating means in assembled relation within the shell in cooperation with the retainer means and thereby maintaining the head end portion of the contact in position within the shell to receive a phono-plug pin in electrical contact in the contact head end portion.

According to a preferred method of making the phono-socket assembly, the retaining fingers are formed to extend axially from the shell in clearance relation to the adjacent open end of the shell, the annular insulating means and the contact being assembled into the shell through such open end, and the fingers then being curled to turn the retaining tips toward and into retaining engagement with the annular insulating means.

18 Claims, 4 Drawing Figures

PHONO-SOCKET ASSEMBLY AND METHOD

This invention relates to improvements in phono-socket assemblies and method of making the same, and is more particularly concerned with phono-sockets having bracket means for mounting the same on a support such as a panel.

Large numbers of phonoconnectors are widely used in effecting separable electrical couplings in television, stereo and high fidelity phonograph apparatus. These connectors comprise a phono-socket assembly and a phono-plug assembly which are adapted to be mated separably in electrical contact. The phono-socket assembly has a grounding shell within which is mounted in insulated relation thereto a tubular contact for reception of a phono-plug pin or plug in electrically contacting engagement while the grounding shell of the phono-plug engages in electrically contacting grounding relation with the grounding shell of the phono-socket assembly.

As conventionally constructed, the phono-socket assembly grounding shell is equipped at its rear end with means for mounting the phono-socket assembly on a support. In one arrangement, the grounding shell is attached to a separately formed mounting bracket which is especially adapted for engagement with a mounting panel such as a printed circuit board having not only a grounding circuit with which the bracket may be connected, but also an operating circuit with which the contact of the phono-socket assembly may be connected. On the other hand, the bracket may be mounted on a grounding support and the contact connected to a lead wire. As heretofore constructed, such arrangement of phono-socket assembly has involved multiple parts and procedures in making the assembly, and in particular in respect to locking the supporting dielectric insulating elements and contact within the grounding shell, and attachment of a separately formed mounting bracket to the grounding shell.

An important object of the present invention is to provide a new and improved phono-socket assembly and mounting bracket which will overcome the disadvantages, drawbacks, inefficiencies, shortcomings and problems inherent in prior phono-socket assemblies of this kind.

Another object of the invention is to provide new and improved means in a phono-socket assembly for retaining the contact supporting mounting means within the grounding shell of a phono-socket assembly.

A further object of the invention is to provide a new and improved method of making phono-socket assemblies.

Still another object of the invention is to provide a new and improved phono-socket assembly wherein the grounding shell and mounting bracket are formed from one piece of sheet metal.

According to features of the invention, there is provided a phono-socket assembly adapted to receive a phono-plug in electrical connection therewith, and comprising stamped and drawn thin sheet metal grounding shell having retainer means at one end of the shell and mounting bracket means on the opposite end of the shell for mounting of the assembly on a support, an elongate tubular contact having a phono-plug pin receiving head end portion of substantially smaller diameter than said shell and mounted within said shell on annular insulating means, and the contact having a terminal portion extending from said head end portion and projecting beyond said opposite end of the shell, said annular insulating means having an end retainingly engaged with said retainer means and an opposite end at said opposite end of said shell, and retaining fingers extending from said opposite end of said shell and having retaining tips turned toward and into retaining engagement with said opposite end of said annular insulating means and substantially spaced from said contact whereby to retain the insulating means in assembled relation within the shell in cooperation with said retainer means and thereby maintaining said head end portion of the contact in position within said shell to receive a phono-plug pin by introduction of the pin through said one end of the shell into electrically contacting engagement within the contact head end portion.

According to other features of the invention there is provided a new and improved method of making the phono-socket assembly, the retaining fingers are formed to extend axially from the shell in clearance relation to the adjacent open end of the shell, the annular insulating means and the contact being assembled into the shell through such open end, and the fingers then being curled to turn the retaining tips toward and into retaining engagement with the annular insulating means.

Other objects, features and advantages of the invention will be readily apparent from the following description of a certain representative embodiment thereof, taken in conjunction with the accompanying drawing although variations and modifications may be effected without departing from the spirit and scope of the novel concepts embodied in the disclosure, and in which.

Figure 1:
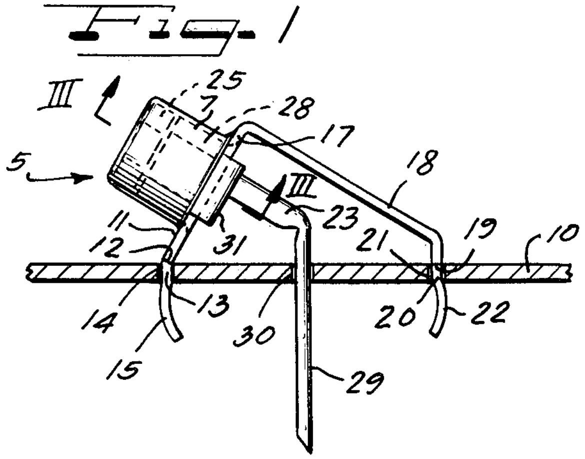
FIG. 1 is a side elevational view of a phono-socket assembly embodying features of the invention.
Figure 2:
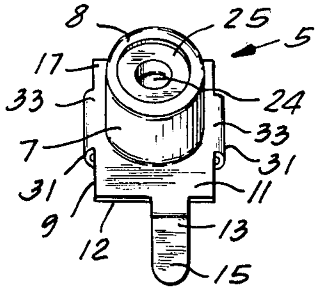
FIG. 2 is a front elevational view of the phono-socket assembly of FIG. 1.

A phono-socket assembly 5 is constructed and arranged to receive a phono-plug (not shown) in electrical connection therewith. As is well known, the phono-plug for phonoconnectors comprises a grounding shell structure carrying an insulated pin to which an electrical lead which may be of the armored cable type is connected with the cable armor electrically attached to the phono-plug grounding shell. When separably coupled with the phono-socket 5, the phono-plug grounding shell engages with an electrically contacting grip about a grounding shell 7 of the phono-socket. In an advantageous construction, the shell 7 is stamped and drawn from thin sheet metal such as steel. At one end, i.e., the front end, the substantially cylindrical shell 7 is provided with retainer means desirably in the form of a narrow radially inwardly directed flange 8. At its opposite end, i.e., its rear end, the shell 7 has bracket means 9 for mounting of the assembly on a support such as a panel 10.

In a preferred construction, the shell 7 and the bracket 9 are formed integrally from one piece of stamped and drawn sheet metal. To this end, the bracket 9 comprises a desirably rectangular sheet metal panel which is longer and wider than the diameter of the shell 7 and from a longitudinal central portion of which the shell 7 is drawn as a tubular protrusion. At opposite ends, the bracket 11 provides arm means for mounting the assembly, comprising in a desirable form a leg 11 having a shoulder end 12 adapted to engage against the support such as the panel 10. Extending from the edge 12 is a narrower retaining finger 13 which is adapted to be received through a complementary aperture 14 in the panel 10 and has a curved spring interlock terminal 15 which is adapted to be longitudinally snap fitted through the aperture 14 and effects a releasable retaining shoulder engaging with an edge defining the aperture 14 opposite the shoulder 12 for retaining the phono-socket assembly in position on the panel 10.

Extending in the opposite direction from the bracket arm 11 is a bracket arm 17 having an elongated angular extension 18 formed with a shoulder 19 for engaging the supporting panel 10 and provided with a narrower locating and retaining finger 20 engageable through a complementary aperture 21 in the panel 10 and equipped with a resiliently flexible longitudinally arcuate releasably retaining shoulder 22 which is engageable with the panel 10 at an edge of the aperture 21 opposite the shoulder 19. Through this arrangement, the one piece sheet metal shell and bracket structure of the phono-socket assembly 5 is adapted to be mounted on the panel 10 by inserting the fingers 13 and 20 through the apertures 14 and 21, respectively, and snapping the fingers into position wherein the shoulders 12 and 19 will be held on the panel 10, mounting the socket shell 7 with its axis extending divergently relative to the plane of the panel 10 and conveniently accessible for attachment of a phono-plug.

Mounted within the grounding shell 7 is an elongate tubular contact 23 having a phono-plug pin receiving head end portion 24 of substantially smaller diameter than the shell 7 and supported in insulated relation to the shell on annular insulating means comprising a washer 25 interposed between the retainer flange 8 and a lateral radially outwardly extending attachment flange 27 on the outer end of the head portion 24. It will be observed that the inside diameter of the insulating washer 25 is at least as great as the inside diameter of the head portion 24, and the retainer flange 8 is of substantially larger diameter than the inside diameter of the washer 25 so that a phono-plug pin can be freely received through the outer end of the shell 7 and the washer 25 into the contact head 24. Maintaining the contact head 24 centered in the shell 7 and clamping the contact head flange 27 against the washer 25 is a substantially rigid insulating sleeve 28 which has its outer end at the rear end of the shell 7. The contact 23 extends substantially beyond the rear end of the shell 7 and has a terminal portion 29 which desirably extends angularly in the same direction as the bracket fingers 13 and 20 and is adapted to extend through a clearance aperture 30 in the panel 10. Where the panel 10 is a printed circuit panel, the bracket fingers 13 and 20 may be soldered to grounding circuit means on the panel, and the terminal 29 may be soldered to operating circuit means. Of course, where the panel 10 itself provides ground connection the fingers 13 and 20 will be directly grounded, and the aperture 30 will permit the terminal 29 to extend freely through the panel whereby the terminal 29 may be soldered to an electrical lead in an operating circuit.

In order to retain the insulating support and contact assembly within the shell 7 in cooperation with the retaining flange 8, retaining tabs or fingers 31 extend generally radially inwardly from the inner end of the shell 7 and have retaining tips 32 turned forwardly generally endwise toward and into thrusting retaining engagement with the adjacent end of the insulating sleeve 28 substantially spaced from the contact 23 whereby to retain the insulating means 25, 28 in assembled relation within the shell in cooperation with the retainer flange 8. Thereby the head end portion 24 of the contact is maintained in position within the shell to receive a phono-plug pin by introduction of the pin through the outer end of the shell into electrically contacting engagement within the contact head end portion 24. In a preferred form, the retaining fingers 31 have base portions 33 extending radially outwardly from integral connection with the inner end of the shell 7. Such base portions 33 are preferably also integrally connected with the bracket arms 11 and 17 which are thus connected together integrally through the finger base portions 33 as well as to the inner end of the shell 7 at diametrically opposite sides of the shell 7.

Figure 3:
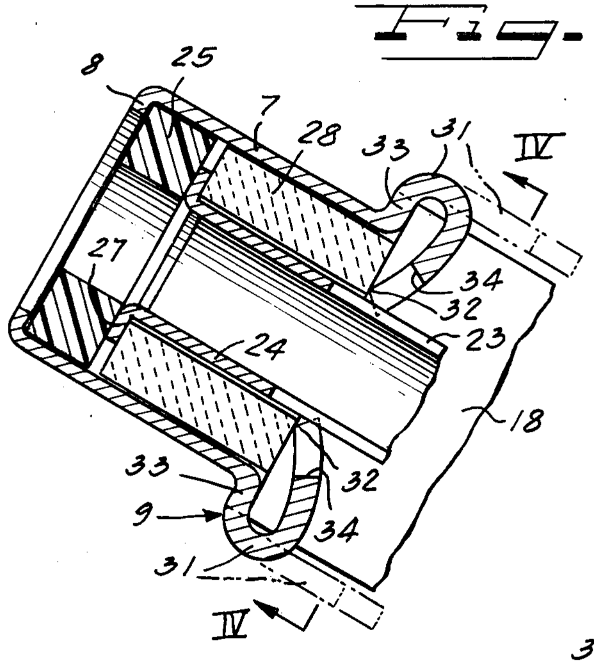
FIG. 3 is an enlarged fragmentary longitudinal sectional detail view taken substantially along the line III—III of FIG. 1.
Figure 4:
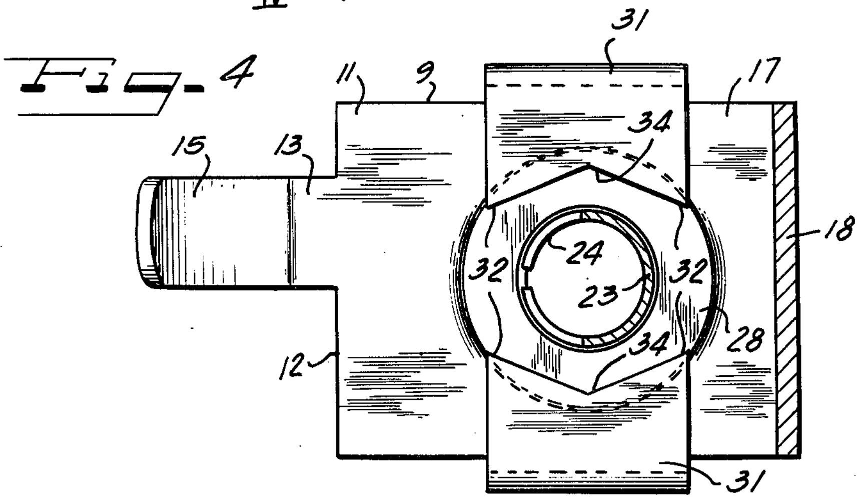
FIG. 4 is a sectional plan view taken substantially along the line IV—IV in FIG. 3.

As initially formed in the stamped and drawn piece, the retaining fingers 31 extend substantially axially rearwardly, as shown in phantom outline in FIG. 3, leaving the open rear end of the shell 7 free for assembly of the contact head end portion 24 and the insulating means 25, 28 into the shell until the insulating washer 25 engages the retainer flange 8 and the rear end of the insulating sleeve 28 is generally in alignment with the rear end of the shell 7. Then to lock the assembly together, the fingers 31 are curled from the axially extending position generally radially inwardly and forwardly until the tips 32 thrust generally endwise against the exposed end of the insulating sleeve 28 at the radially outer marginal portion of the insulating sleeve 28. This presses the sleeve 28 against the contact head flange 27 and the contact head flange 27 against the insulating washer 25 and the insulating washer against the retainer flange 8 to maintain a thoroughly tight, compact permanent assembly. In order to assure ample clearance from the contact 23, the tip ends of the fingers 31 are widely notched out as by means of a generally V-shaped notch 34, substantially as shown. Thereby the finger tips 32 are substantially in the form of prongs and make efficient two-point thrusting contact with the insulating sleeve 28 at each side of each of the fingers. By virtue of the curling to which the fingers 31 are subjected, they are cold worked and hardened so that there is minimum tendency for spring back. Further, because of the generally triangular tip formation toward the actual contacting tip ends on each of the fingers, it is possible to overcurl sufficiently during the lock-in operation because the finger tips can yield slightly resiliently and engage the insulating sleeve 28 with full retaining thrusting force even though there may be slight spring back of the curled fingers at completion of the curling lock-in. In any event the locking together of all of the components of the phono-socket assembly 5 is quite thoroughly and permanently effected by the curling over of the integral retaining fingers 31.

From the foregoing it will be apparent that the one piece phono-socket shell and bracket and retaining flange and finger structure provide a low-cost, compact, efficient grounding unit and phono-socket contact mount, free from any partings or joints which might be liable to electrical resistance or other disadvantage. The novel curled retaining finger locking together of the parts of the assembly not only provides an efficient securing device, but also simplifies the final locking together of the components of the assembly.

It will be understood that variations and modifications may be effected without departing from the spirit and scope of the novel concepts of this invention.

I claim as my invention:

1. A phono-socket assembly adapted to receive a phono-plug in electrical connection therewith, and comprising:

a stamped and drawn thin sheet metal grounding shell having retainer means at one end of the shell and mounting bracket means on the opposite end of the shell for mounting of the assembly on a support;

an elongate tubular contact having a phono-plug pin receiving head end portion of substantially smaller diameter than said shell and mounted within said shell on annular insulating means, and the contact having a terminal portion extending from said head end portion and projecting beyond said opposite end of the shell;

said annular insulating means having an end retainingly engaged with said retainer means and an opposite end at said opposite end of said shell; and retaining fingers extending generally radially inwardly from said opposite end of said shell and having retaining tips turned toward and into generally endwise thrusting retaining engagement with said opposite end of said annular insulating means and substantially spaced from said contact whereby to retain the insulating means in assembled relation within the shell in cooperation with said retainer means and thereby maintaining said head end portion of the contact in position within said shell to receive a phono-plug pin by introduction of the pin through said one end of the shell into electrically contacting engagement within the contact head end portion.

2. An assembly according to claim 1, wherein said grounding shell and said bracket means comprise an integral structure made without joints from a single piece of sheet metal.

3. An assembly according to claim 2, wherein said bracket means include legs engageable in mounting relation on a support.

4. An assembly according to claim 2, wherein said bracket means comprise a panel from which the grounding shell comprises a drawn tubular protrusion, said panel having structure projecting therefrom generally in the opposite direction from the projection of the grounding shell from the panel, said structure being engageable with a support for mounting the assembly.

5. An assembly according to claim 2, wherein said retaining fingers are integrally connected to the shell and to the bracket means.

6. An assembly according to claim 5, wherein said retaining fingers are originally elongate elements clear of said opposite end of the shell to permit mounting within the shell of said insulating means and said tubular contact head end portion, and said fingers being curled toward said opposite end of the insulating means for generally endwise engagement of said retaining tips with the insulating means.

7. An assembly according to claim 6, wherein said finger tips have clearance notches to assure a substantial spaced relation to said contact, and prong-like extremities which engage generally endwise with the radially outer marginal portion of said annular insulating means.

8. An assembly according to claim 1, wherein said finger tips have clearance notches to assure a substantial spaced relation to said contact, and prong-like extremities which engage generally endwise with the radially outer marginal portion of said annular insulating means.

9. An assembly according to claim 8, wherein said retaining fingers are curled from an originally generally axially extending relation to the shell.

10. A method of making a phono-socket assembly adapted to receive a phono-plug in electrical connection therewith, comprising:

stamping and drawing a thin sheet metal grounding shell with retainer means at one end of the shell;

providing mounting bracket means on the opposite end of the shell for mounting of the assembly on a support;

mounting an elongate tubular contact having a phono-plug pin receiving head end portion of substantially smaller diameter than said shell within said shell on annular insulating means and with a terminal portion of the contact means extending from said head end portion projecting beyond said opposite end of the shell;

locating said annular insulating means with an end retainingly in engagement with said retainer means and an opposite end at said opposite end of said shell;

and turning retaining fingers extending from said opposite end of said shell generally radially inwardly toward, and with retaining tips of the fingers thrusting generally endwise in retaining engagement with said opposite end of the annular insulating means and substantially spaced from said contact and thereby retaining the insulating means in assembled relation within the shell in cooperation with said retainer means and maintaining said head end portion of the contact in position within said shell to receive a phono-plug pin by introduction of the pin through said one end of the shell into electrically contacting engagement within the contact head end portion.

11. A method according to claim 10, comprising forming said grounding shell and said bracket means as an integral structure without joints from a single piece of sheet metal.

12. A method according to claim 11, comprising forming said bracket means with legs engageable in mounting relation on a support.

13. A method according to claim 11, comprising forming said bracket means substantially as a panel, drawing the grounding shell as a tubular protrusion in said panel, and forming integrally with the panel, a structure projecting therefrom in generally the opposite direction from the projection of the grounding shell from the panel and engageable with a support for mounting the assembly.

14. A method according to claim 11, comprising forming said retaining fingers integrally with the shell and the bracket means.

15. A method according to claim 14, comprising forming said retaining fingers as elongate elements clear of said opposite end of the shell, mounting said insulating means and said tubular contact end portion within the shell from said opposite end, and then curling said fingers toward said opposite end of the insulating means and engaging said retaining tips generally endwise with the insulating means.

16. A method according to claim 15, comprising forming said finger tips with clearance notches to assure a substantially spaced relation to said contact, and providing prong-like extremities on said finger tips and engaging the prong-like extremities generally endwise with the radially outer marginal portion of said annular insulating means.

17. A method according to claim 10, comprising forming said finger tips with clearance notches to assure a substantially spaced relation to said contact, and providing prong-like extremities on said finger tips and engaging the prong-like extremities generally endwise with the radially outer marginal portion of said annular insulating means.

18. A method according to claim 17, comprising forming said retaining fingers in originally generally axially extending relation to the shell, and then curling the retaining fingers from said axially extending relation to the shell into said tip extremity endwise engagement with said insulating means.

* * * * *